United States Patent
Sigg et al.

(10) Patent No.: US 7,945,281 B1
(45) Date of Patent: *May 17, 2011

(54) METHOD AND SYSTEM FOR DYNAMICALLY ADJUSTING FORWARD-LINK TRANSMISSION POWER FOR SOLE SECTOR SERVING ONE OR MORE ACTIVE MOBILE STATIONS IN CLUSTER

(75) Inventors: Jason P. Sigg, Olathe, KS (US); Meng Y. Yew, Olathe, KS (US); Hector M. Ribas, Overland Park, KS (US); Abhijit V. Apte, Overland Park, KS (US); Nandish M. Chalishazar, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1153 days.

This patent is subject to a terminal disclaimer.

(21) Appl. No.: 11/078,677

(22) Filed: Mar. 11, 2005

(51) Int. Cl.
H04B 7/00 (2006.01)

(52) U.S. Cl. .................................... 455/522; 455/67.11

(58) Field of Classification Search ............. 455/522
See application file for complete search history.

(56) References Cited

U.S. PATENT DOCUMENTS

| | | | |
|---|---|---|---|
| 6,157,668 A * | 12/2000 | Gilhousen et al. | 375/130 |
| 6,577,608 B1 | 6/2003 | Moon et al. | |
| 6,728,550 B1 * | 4/2004 | Bohnke et al. | 455/522 |
| 7,099,384 B1 * | 8/2006 | Jalali et al. | 375/229 |
| 2003/0123410 A1 | 7/2003 | Youm | |
| 2003/0174666 A1 * | 9/2003 | Wallace et al. | 370/324 |
| 2003/0197557 A1 * | 10/2003 | Pearce | 330/124 R |
| 2004/0180661 A1 * | 9/2004 | Chen et al. | 455/436 |
| 2005/0096077 A1 * | 5/2005 | Moon | 455/522 |
| 2006/0073791 A1 * | 4/2006 | Senarath et al. | 455/67.13 |

OTHER PUBLICATIONS

U.S. Patent Application filed on Mar. 11, 2005, entitled "Method and System for Dynamically Adjusting Forward-Link Transmission Power in Sole Active Sector", inventors are Jason P. Sigg, Meng Y. Yew, Hector M. Ribas, Abhijit V. Apte and Nandish M. Chalishazar.

* cited by examiner

*Primary Examiner* — Duc Nguyen
*Assistant Examiner* — Ankur Jain (57) ABSTRACT

A method and system are disclosed for dynamically adjusting forward-link transmission power in a cellular wireless communication system. A base station controller (BSC) or other radio network entity determines that a given cell sector a given sector is serving at least one active mobile station while no other sector in a cluster of sectors associated with the given sector is also serving at least one active mobile station. In response, the BSC dynamically increases the pilot transmit power in the given sector to a level beyond the sector's normal (full) transmit power, in an effort to increase requested data transmission speed in the sector.

17 Claims, 5 Drawing Sheets

METHOD AND SYSTEM FOR DYNAMICALLY ADJUSTING FORWARD-LINK TRANSMISSION POWER FOR SOLE SECTOR SERVING ONE OR MORE ACTIVE MOBILE STATIONS IN CLUSTER

FIELD OF THE INVENTION

The present invention relates to wireless communications and, more particularly, to management of power levels and data rates in a wireless packet data communication system. The invention can be usefully employed in a network that is compliant with the well known IS-856 (EV-DO) standard. However, the invention may apply in other networks as well.

DESCRIPTION OF RELATED ART

1. Cellular Wireless Communications

In a typical cellular radio communications system (wireless telecommunications network), an area is divided geographically into a number of cell sites, each defined by a radio frequency (RF) radiation pattern from a respective base transceiver station (BTS) antenna. The base station antennae in the cells are in turn coupled to a base station controller (BSC) or radio network controller (RNC), which is then coupled to a telecommunications switch and/or gateway, such as a packet data serving node (PDSN) for instance, which provides connectivity with a transport network such as the Internet.

When a mobile station or Access Terminal (AT) (such as a cellular telephone, pager, or appropriately equipped portable computer, for instance) is positioned in a cell, the mobile station communicates via an RF air interface with the BTS antenna of the cell. Consequently, a communication path is established between the mobile station and the telecommunications network, via the air interface, the BTS, the BSC and the switch or gateway.

With the explosive growth in demand for wireless communications, the level of call traffic in most cell sites has increased drastically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, a mobile station in a wireless network will typically be positioned in a given physical sector and will be able to communicate with the telecommunications network via the BTS serving that physical sector.

2. Legacy CDMA Communications

In a conventional or "legacy" Code Division Multiple Access ("CDMA") wireless network compliant with industry standards TIA/EIA/IS-95 and TIA/EIA/IS-2000, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

Air interface communications are divided into forward-link communications, which are those passing from the base station to the mobile station, and reverse link communications, which are those passing from the mobile station to the base station. In an IS-95 or IS-2000 system, both the forward-link and reverse link communications in a given sector are encoded by the sector's PN offset and a given Walsh code.

On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels. Further, the various forward-link channels share the forward-link power that is available in the sector. Therefore, when more mobile stations are operating in a sector, the forward-link power allocated for transmissions to each mobile station will typically be lower than when fewer mobile stations are operating in the sector.

To engage in packet-data communication in a legacy network, a mobile station first sends a packet-data origination request over the access channel to the network. The BSC then assigns a traffic channel for use by the mobile station, and the PDSN and mobile station negotiate with each other to establish a data link layer connection, such as a point to point protocol (PPP) session. Further, the PDSN sends a foreign agent challenge message to the mobile station, and the mobile station responds with a mobile-IP registration request (MIP RRQ), which the PDSN forwards to a mobile-IP home agent (HA). The HA then assigns an IP address for the mobile station to use, and the PDSN passes that IP address via the BSC to the mobile station.

Once the mobile station has a radio link (an assigned traffic channel), a data link, and an IP address, the mobile station is considered to be in an "active" mode. To conserve air interface resources, however, the wireless communication system is typically arranged to release the mobile station's assigned traffic channel after a certain amount of time during which no data traffic passes to or from the mobile station through the PDSN. Upon release of the mobile station's radio link, the mobile station is considered to be in a "dormant" mode, in which it lacks a radio link but still has a data link and an IP address.

While in the dormant mode, if the mobile station seeks to transmit packet-data from its IP address, the mobile station would re-acquire a radio link by sending a new origination request message to the BSC. Similarly, if the PDSN receives packet-data destined for the IP address of a dormant mobile station, the PDSN would notify the BSC, the BSC would page the mobile station to cause the mobile station to then re-acquire a radio link, and the PDSN would then pass the data along to the mobile station.

According to IS-95 and IS-2000, a mobile station can communicate with a number of "active" sectors at a time. Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are members of a "remaining" set.

To facilitate a determination of which sectors should be in the mobile station's "active" set, all base stations emit a pilot channel signal, typically at a power level higher than other forward-link signals. A mobile station then constantly measures the strength of each pilot that it receives (or, more particularly, the $E_c/I_o$ (pilot power/total power) of each such pilot) and notifies a primary base station (a base station currently serving the mobile station) when pilot strength falls above or below designated thresholds. The base station, in turn, provides the mobile station with an updated list of active pilots.

3. High Rate Packet-Data Communications

Under IS-2000, the highest rate of packet-data communications theoretically available on a fundamental traffic channel of the forward link is 9.6 kbps (under "Radio Configuration 3" (RC3), which provides 64 Walsh codes per sector) or 19.2 kbps (under RC4, which provides 128 Walsh codes per sector). In order to provide higher rate packet-data service to support higher bandwidth applications, the industry has introduced a new "high rate packet data (HRPD) system," which is currently defined by industry standard IS-856. IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel, which the mobile station uses to request a specific data rate and sector for communication. The end result is that a mobile station operating under IS-856 can, in theory, receive packet-data at a rate of at least 38.4 kbps and up to 2.4 Mbps.

The IS-856 forward link in each sector is divided into time slots of length 2,048 chips, and each time slot is further time division multiplexed to carry various channels, including a pilot channel, a Medium Access Control (MAC) channel, and, if any traffic exists, a forward traffic channel and a "control" channel. More particularly, each 2,048 chip time slot is divided into two half slots of 1,024 chips each. And each half slot is in turn divided into (i) a 400 chip data channel, (ii) a 64 chip MAC channel, (iii) a 96 chip pilot channel, (iv) another 64 chip MAC channel, and (v) another 400 chip data channel.

The IS-856 data channel includes a traffic channel and a control channel. The traffic channel transmits to a single mobile station at a time and thus includes a preamble sequence that indicates the start of the packet and the intended receiving mobile station. The control channel transmits both broadcast messages and mobile station-directed messages. A slot during which no traffic or control data is transmitted is referred to as an "idle slot" and would effectively not include the data channels. A slot during which traffic or control data is transmitted, on the other hand, is referred to as an "active slot" and would effectively include the data channels.

As in IS-2000, each sector in IS-856 is defined by a PN offset, and the pilot channel carries an indication of the sector's PN offset, distinguished by increments of 64 chips. An IS-856 mobile station uses the pilot for initial acquisition, phase recovery, timing recovery, and symbol combining. Further, as will be described more below, the IS-856 pilot is used to provide an estimate of channel data rate, for the purpose of rate adaptation.

Each IS-856 sector has a normal power level (e.g., 16 Watts) at which the sector transmits on the pilot channel, on the MAC channel, and, in an active slot, on the data channel. In the data channel on an idle slot, the sector will substantially reduce its output power output (e.g., to 4 Watts), but the sector will continue to transmit at its normal sector power level on the pilot and MAC channels. (In a usual case, to avoid damaging the power amplifier, the sector will not totally shut off its power amplifier during the data channel on an idle slot. Rather, the sector may simply switch to the lower power level and transmit zeros during the data channel, and then switch back to the normal power level for the MAC and pilot channels.)

When multiple sectors transmit on a common frequency, the forward-link signaling of the various sectors is synchronized by CDMA system time. Thus, all sectors will transmit their data channels (if any) at the same time, all sectors will transmit their MAC channels at the same time, and all sectors will transmit their pilot channels at the same time.

IS-856 introduces a "virtual soft handoff" concept, in which an active mobile station communicates with the network on just a "best" sector of its active set at any given time. As in IS-2000, the mobile station monitors the signal strength of pilot signals emitted by various sectors, and the mobile station uses threshold handoff parameters as a basis to trigger the addition of a sector to the mobile station's candidate set. More particularly, under IS-856, a mobile station monitors the signal strength of all pilots that it can detect and computes for each sector a signal-to-noise ratio, C/I, as the ratio of (i) C=pilot strength of the sector to (ii) I=total signal level of all detected pilots. Further, as in IS-2000, the mobile station sends a revised candidate set to the network, and the network decides whether to revise the mobile station's active set and instructs the mobile station accordingly.

Unlike IS-2000 in which forward traffic information is routed to all sectors in the mobile station's active set, however, forward traffic under IS-856 is routed on only a "best" sector that the mobile station selects from its active set, typically the sector that has the strongest pilot signal (or, more particularly, the highest signal to noise ratio (C/I)) detected by the mobile station. In practice, the mobile station will monitor the pilot signals of the sectors in its active set, and will include in its DRC (on the reverse link) an indication (e.g., the PN) of the selected serving sector. Only that sector will then serve the mobile station with forward-link packets. Thus, a mobile station may quickly hand off from one IS-856 serving sector to another by simply instructing the base station which sector it intends to communicate with.

As noted above, the pilot signal of a selected IS-856 sector is used as a basis to estimate channel conditions and to facilitate rate adaptation. In this regard, IS-856 defines a mapping between values of C/I and forward-link data rates. Based on the C/I that the mobile station computes for its selected sector, the mobile station will use the defined mapping to select a particular data rate. And the mobile station will include in its DRC a request to receive forward-link communications at that data rate. According to IS-856, the higher the C/I, the higher the requested data rate, and the lower the C/I, the lower the requested data rate.

Upon receipt of the DRC from the mobile station, the base station will decide whether or not it will grant the mobile station's requested forward-link data rate. In this regard, the base station will apply a scheduling algorithm to determine which requests to grant and which requests to deny. The scheduling algorithm is vendor-specific and can therefore take various forms. If the base station decides to grant the request, the base station will then seek to deliver data to the mobile station at the requested rate.

Under IS-856, when the base station transmits a data packet to a mobile station, the mobile station responds with an acknowledgement (ACK) message if the mobile station successfully receives the data, or with a negative acknowledgement (NACK) if the mobile station does not successfully receive the data. If the base station does not receive an ACK from the mobile station or receives a NACK from the mobile station, then the base station retransmits the packet.

In defining the correlations between C/I and data-rate, IS-856 assumes that a certain amount of retransmission may be required. For instance, when the C/I is lower, a reasonable assumption is that (i) the RF conditions are worse, (ii) the likelihood of successful data transmission is therefore lower, and so (iii) the base station may need to include more redundancy (error correction) information together with the payload it is transmitting. As a result, when C/I is lower, IS-856 assumes that the effective payload transmission rate will be lower. That is, according to IS-856, the lower the C/I measured by a mobile station, the lower the data rate the mobile station would request in its DRC.

In many cases, however, transmission may succeed more quickly than anticipated, with less retransmission being required. When that happens, in a process known as "early termination" (or "Hybrid ARQ"), the forward-link data rate effectively increases beyond that requested by the mobile station, since data passes to the mobile station more quickly than requested.

To acquire packet data connectivity under IS-856, after a mobile station first detects an IS-856 carrier frequency, the mobile station sends to its BSC a UATI (Universal Access Terminal Identifier) request, and receives in response a UATI assignment. Upon assignment of the UATI the mobile station must then submit a connection request to acquire a MAC ID (e.g., an International Mobile Station Identifier (IMSI)), which the BSC can then use to address the mobile station in subsequent communications. In addition to the MAC ID assignment response from the connection request, the BSC responsively invokes a process to authenticate the mobile station and to have the mobile station acquire a data link.

In particular, the BSC sends an access request to an Access Network AAA (ANAAA) server, and the ANAAA server authenticates the mobile station. The BSC then assigns radio resources for the data session, by directing the mobile station to operate on a particular time slot traffic channel on the forward link and a particular Walsh coded traffic channel on the reverse link. Further, the BSC signals to the PDSN, and the PDSN and mobile station then negotiate to establish a PPP data link. In addition, as in the IS-2000 process, the mobile station then sends an MIP RRQ to the PDSN, which the PDSN forwards to a HA, and the HA assigns a mobile-IP address for the mobile station to use.

As in IS-2000, once the mobile station has acquired an IS-856 radio link, a data link, and an IP address, the mobile station is considered to be in an active mode, also known as the connected state. In the active mode, as noted above, the mobile station is given full use of the sector's forward link power in its assigned time slot, i.e., each time the data channel in its time slot occurs, which facilitates higher rate data communication. Further, an active mode mobile station transmits reverse link signaling at substantially all times to one or more active set sectors. (As a more general matter, a mobile station can be considered to be in an "active" mode when radio link resources, such as a reverse link channel, and perhaps also a forward link timeslot, are reserved for its use to engage in packet-data communication.)

Still further, as in IS-2000, if the mobile station does not send or receive data for a defined period of time, the mobile station enters a dormant mode. In the dormant mode, an IS-856 system maintains the logical state of the mobile station's session (e.g., IP address, PPP state, and radio link session information), while releasing the mobile station's radio link resources (e.g., the time slot that had been assigned for communications to the mobile station and the reverse link channel that had been assigned for communications from the mobile station). With the maintained session state, the mobile station can quickly re-acquire a radio link so as to send or receive packet data, thereby giving the appearance that the mobile station is "always on."

SUMMARY

Under the IS-856 process as described above, a mobile station will decide what forward-link data rate to request based on the C/I that it computes for its selected sector. Further, the forward link of all sectors on a given carrier under the control of a given BSC will be synchronized in time. Thus, when a mobile station computes the C/I for its selected sector (that is, for the sector that it will select), the mobile station's computation of the denominator, I, will take into account the pilot signals of all sectors covering the mobile station's current location, each of which will be transmitted at its normal ("full") sector power.

The result of this process is that the data rate requested by an IS-856 mobile station will generally be lower as more sectors cover the mobile station's current location (since the denominator, I, of the ratio C/I will increase accordingly).

Unfortunately, however, this process fails to take into account the fact that a sector will transmit its pilot signal at the normal sector power in a given slot regardless of whether the sector also transmits packet-data to any mobile station in that slot. Consequently, based on an analysis of the total pilot power in a slot (reflecting the presence of possibly multiple sectors), the mobile station may compute a relatively low C/I, and the mobile station may therefore request a relatively low forward-link data rate. As a result, the BSC will likely begin transmitting packet-data to the mobile station at the requested low data rate. Yet if no other sector that covers the mobile station's current location is actually transmitting packet-data on the forward link, the early termination process will then likely cause the mobile station's selected sector to be able to transmit packet-data to the mobile station at a data rate higher than that requested.

The BSC's initial transmission at the requested low data rate in this scenario is inefficient, since the full early-termination process must then occur in order to ultimately bring the transmission rate up to where it really should be. It would be better in this scenario for the BSC to simply begin by transmitting at a higher data rate.

A first aspect of the present invention leverages and improves upon the early termination process in a scenario where only one sector covering the mobile station's current location is transmitting packet-data. According to the invention, when only one sector covering the mobile station's current location (on a given carrier frequency) is transmitting data (currently transmitting or about to transmit), the base station will increase the data channel transmit power on that sector, beyond the sector's normal transmit power level. Increasing the data channel transmit power in the serving sector should increase the chances that the mobile station will receive transmitted data and should thus decrease the amount of required retransmission. Consequently, early termination should occur more quickly (if at all), thereby increasing the effective data rate to the mobile station.

A second aspect of the invention similarly involves increasing sector transmit power based on an analysis of a cluster of sectors. According to the second aspect, however, the BSC will instead (or in addition) increase a sector's pilot channel transmit power in response to a determination that no other sector in the sector's associated cluster currently serves at least one active mobile station.

The rationale for this process is that, when no other sector in the cluster is currently serving an active mobile station, increasing the pilot channel transmit power in the sector will beneficially cause each mobile station in the sector to compute a higher C/I ratio for the sector than the mobile station would otherwise compute. Consequently, the mobile station will be likely to request a higher starting data rate in the next DRC it sends to the BSC, and the BSC will likely begin transmitting to the mobile station at a higher data rate than the BSC would otherwise. Given a higher starting data rate for the mobile station, there would be less need for early termination in order to increase the effective data rate to the mobile station, since the data rate would already be higher than it would otherwise be.

On the other hand, when any other sector in the cluster (like the current sector) is serving an active mobile station, increasing the pilot channel transmit power in the current sector could undesirably reduce the C/I computation for the other sector. A mobile station that would normally be served by the other sector might then end up requesting to be served by the current sector, which may be inefficient.

These and other aspects, advantages, and alternatives will become apparent to those of ordinary skill in the art by reading the following detailed description, with reference where appropriate to the accompanying drawings. Further, it should be understood that this summary, as well as other descriptions herein, are intended to illustrate the invention by way of example only and are not intended to limit the scope of the invention as claimed.

DETAILED DESCRIPTION OF EXEMPLARY EMBODIMENTS

Embodiments of the present invention will be described in the context of a cellular wireless communication system that is generally compliant with IS-856. It should be understood, however, that the invention can apply in the context of other systems as well. For instance, aspects of the invention could be applied to legacy CDMA systems (such as IS-95 or IS-2000 systems) or to systems compliant with other air-interface protocols altogether.

Two embodiments of the invention will be described here. A given system can apply either or both of these embodiments as a way to improve allocation of air-interface resources and, ultimately, to improve user experience.

1. Example Base Network architecture and Operation

Figure 1:
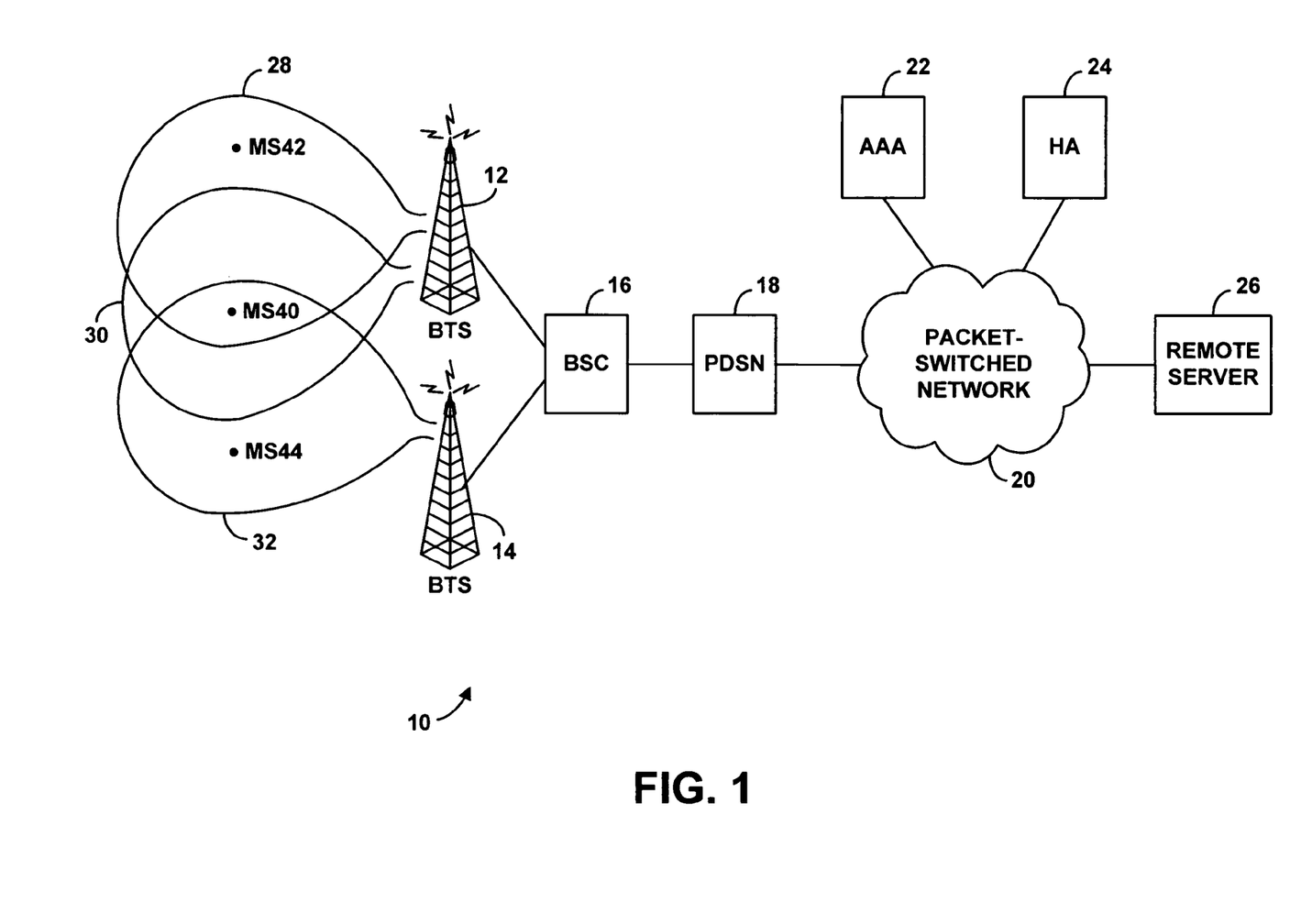
FIG. 1 is a block diagram of a cellular wireless communication system in which an exemplary embodiment of the invention can be employed.

Referring to the drawings, FIG. 1 depicts a cellular wireless communication system 10 in which embodiments of the invention can employed. It should be understood that the specific arrangement shown, like other arrangements shown and described herein, is only an example, and that many variations are possible. For instance, elements and functions can be added, omitted, combined, re-ordered, or distributed in various ways, and functional components can be implemented by software, firmware, and/or hardware.

As shown in FIG. 1, example communication system 10 includes a plurality of base transceiver stations (BTSs) 12, 14 coupled with a base station controller (BSC) 16. BSC 16 is coupled with a packet data serving node (PDSN) 18, which functions as a network access server to provide connectivity with a packet-switched network 20. Sitting as nodes on packet-switched network 20 are then an authentication, authorization, and accounting (AAA) server 22, a mobile-IP home agent (HA) 24, and a remote server 26.

Each BTS 12, 14 includes antennas that radiate to define one or more sectors or other wireless coverage areas. By way of example, FIG. 1 depicts three such sectors 28, 30, 32, two of which originate at BTS 12, and one of which originates at BTS 14. (An actual implementation may include more or fewer sectors, but three are shown here for simplicity.) Further, for each sector 28, 30, 32, each BTS includes a forward-link power amplifier (not shown) with an adjustable gain, which is used to control the power level of forward-link transmissions.

FIG. 1 depicts several example mobile stations (such as cell phones, personal digital assistants (PDAa) or other wireless communication devices) 40, 42, 44 located within the sectors. One mobile station 40 sits at a point of overlap between sectors 28, 30, and 32, another mobile station 42 sits within sector 28, and another mobile station 44 sits within sector 32. With this arrangement, each of the illustrated mobile stations can acquire packet-data connectivity through BSC 16 and PDSN 18, in the manner described above for instance, and can then engage in packet-data communication with entities on network 20, such with as remote server 26.

Figure 2:
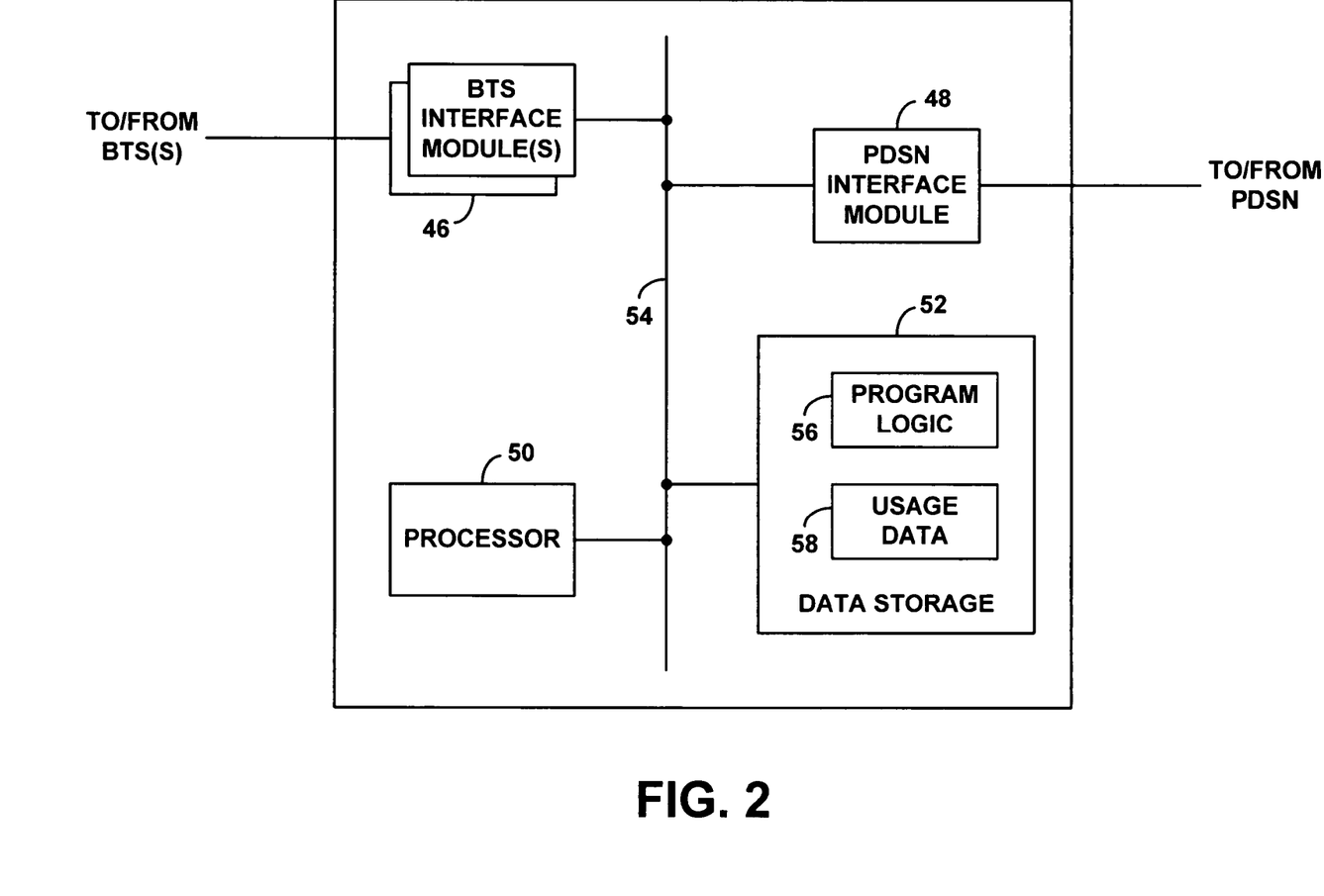
FIG. 2 is a block diagram depicting functional components of a base station controller arranged to carry out the invention in accordance with the exemplary embodiment.

FIG. 2 is a block diagram depicting functional components of BSC 16. As shown in FIG. 2, BSC 16 includes one or more BTS-interface modules 46, a PDSN-interface module 48, a processor 50, and data storage 52, all of which are coupled together by a system bus, network, or other mechanism 54.

Each BTS-interface module 46 comprises software, firmware, and/or hardware components adapted to communicate with and control a respective BTS. For instance, one BTS-interface module may communicate with and control BTS 12, and another BTS-interface module may communicate with and control BTS 14. Each BTS-interface module may be a discrete circuit card, and multiple BTS-interface modules may be housed together in a common BSC chassis. PDSN interface module 48 similarly comprises software, firmware, and/or hardware components adapted to communicate with PDSN 18, so as to facilitate communication on network 20.

Processor 50 comprises one or more general purposes processors (e.g., microprocessors) or special-purpose dedicated processors (e.g., digital signal processing units). And data storage 52 comprises one or more volatile and/or nonvolatile storage components, such as magnetic or optical storage components. Data storage 52 can be integrated in whole or in part with processor 50. Further, processor 50 and/or data storage 52 can be integrated in whole or in part with BSC interface module(s) 46 and/or PDSN interface module 48. Further, BSC 16 may include other components or take other forms as well.

As further shown, data storage 52 includes program logic 56 and usage data 58. Program logic 56 preferably comprises machine language instructions executable by processor 50 to carry out various functions described herein, such as to adjust forward-link transmission power in a given sector based on an analysis of usage conditions in the sector and in associated (e.g., neighboring) sectors. Usage data 58, in turn, preferably comprises a record of which sectors are serving which mobile stations, which mobile stations are active, which mobile stations are currently receiving data, and so forth, for reference by the BSC in determining when to adjust sector transmit power.

Figure 3:
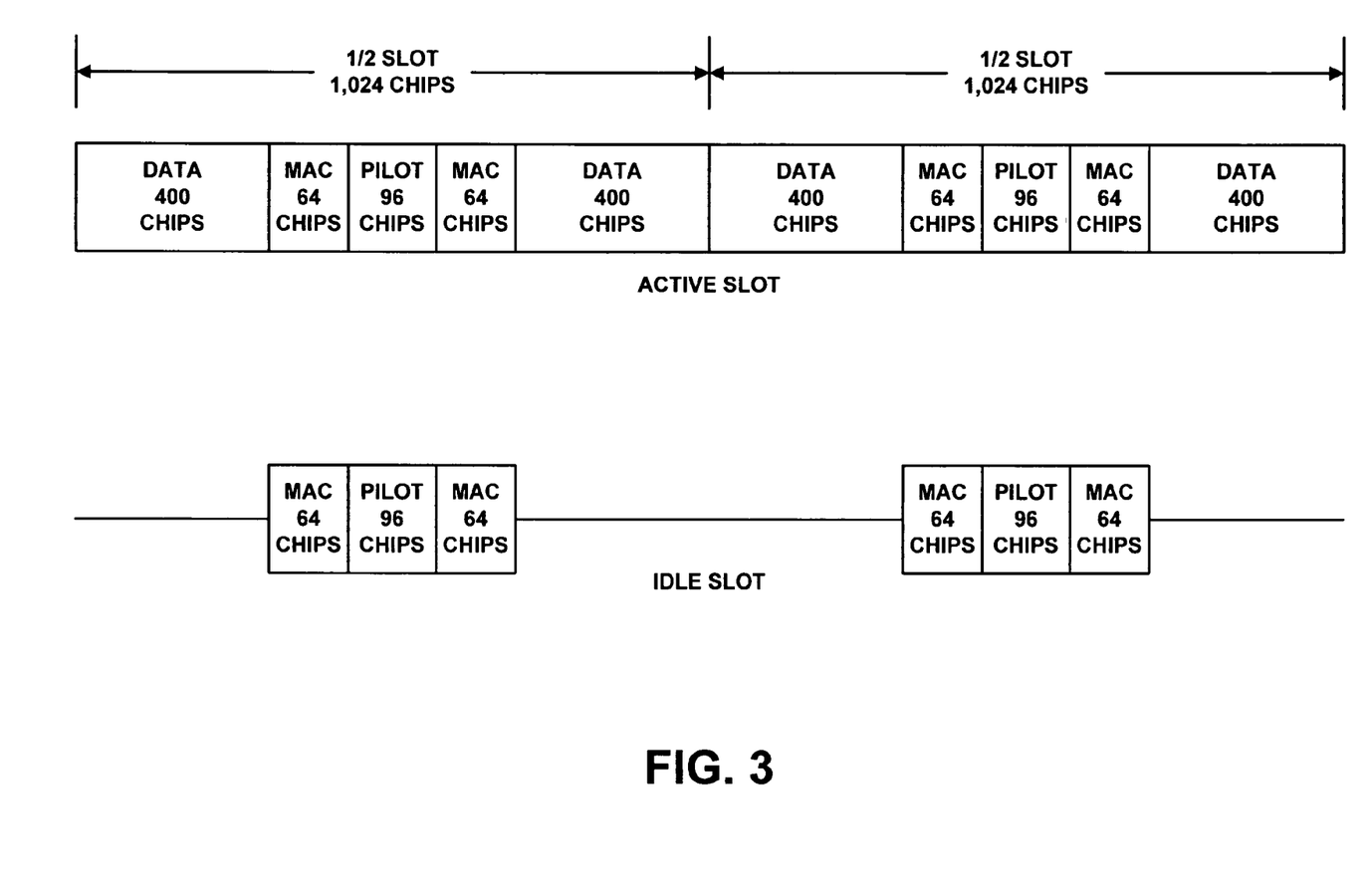
FIG. 3 is a timing diagram depicting synchronized timeslots among multiple sectors or other coverage areas of the communication system shown in FIG. 1.

As explained above, forward-link transmissions in each IS-856 sector are divided into timeslots and, in turn, channels. FIG. 3 illustrates an example of such a timeslot, which, as noted above, is 2,048 chips long. As shown, the timeslot is divided into two half slots of 1,024 chips each, and each half slot is then divided into a 400 chip data channel, a 64 chip MAC channel, a 96 chip pilot channel, another 64 chip MAC channel, and another 400 chip data channel. As noted above, an "active" timeslot is one that carries traffic or control data and thus effectively includes the data channel segments, whereas an "idle" timeslot is one that carries no traffic or control data and thus effectively includes no data channel segments.

Under IS-856, the BSC controls transmissions in these timeslots. In particular, the BSC applies a scheduling algorithm to allocate the timeslots for forward-link transmissions to various mobile stations. Further, the BSC controls the power of forward-link transmissions in each timeslot by controlling the gain of the sector power amplifiers. In each sector, for instance, the BSC will set the gain to a normal level ("full" sector power) for transmissions in the pilot and MAC channels and, in an active timeslot, for transmissions in the data channel. In an idle timeslot, on the other hand, the BSC will substantially reduce the gain (or turn off the power amplifier if feasible) to effectively provide no data channel transmissions.

As further noted above, forward-link transmissions in multiple sectors served by a common BSC are synchronized (exactly or substantially) by CDMA system time. Thus, in the arrangement of FIG. 1, since sectors 28, 30, and 32 are all served by BSC 16, their forward-link transmissions will be synchronized. As explained, this synchronization can result in diminished performance for a mobile station that sits at the point of overlap of multiple sectors, because the mobile station would take all of the full-power pilots into account when computing C/I for its selected serving sector and would thus end up requesting a relatively low data rate, regardless of whether the other sectors are currently serving any active mobile stations or are currently transmitting any data.

In the arrangement of FIG. 1, for instance, mobile station 40 sits at the point of overlap of all three sectors 28, 30, and 32, and thus receives the pilot signal of each sector transmitted at full sector power. Consequently, when mobile station 40 computes a C/I value for its selected serving sector (e.g., sector 30), the pilots from all three sectors will factor into the denominator, I, regardless of whether two sectors are currently serving any active mobile stations or transmitting data. Given the relatively low C/I computation, mobile station 40 will then request and receive from BSC 16 a relatively low starting data rate. Yet, if the other sectors are in fact not currently transmitting data to any other mobile stations, the early-termination process would then likely take effect over time to increase the mobile station's effective forward-link data rate.

2. Increasing Data-Transmission Power FOR SOLE SERVING SECTOR IN CLUSTER

As noted above, a first embodiment of the present invention leverages and improves upon the early termination process in a scenario where only one sector covering the mobile station's current location is transmitting packet-data. When that happens, the BSC will increase the data channel transmit power on that sector to beyond the sector's normal transmit power, so as to increase the chances that the mobile station will receive the transmitted data and thus to expedite the early termination process.

Figure 4:
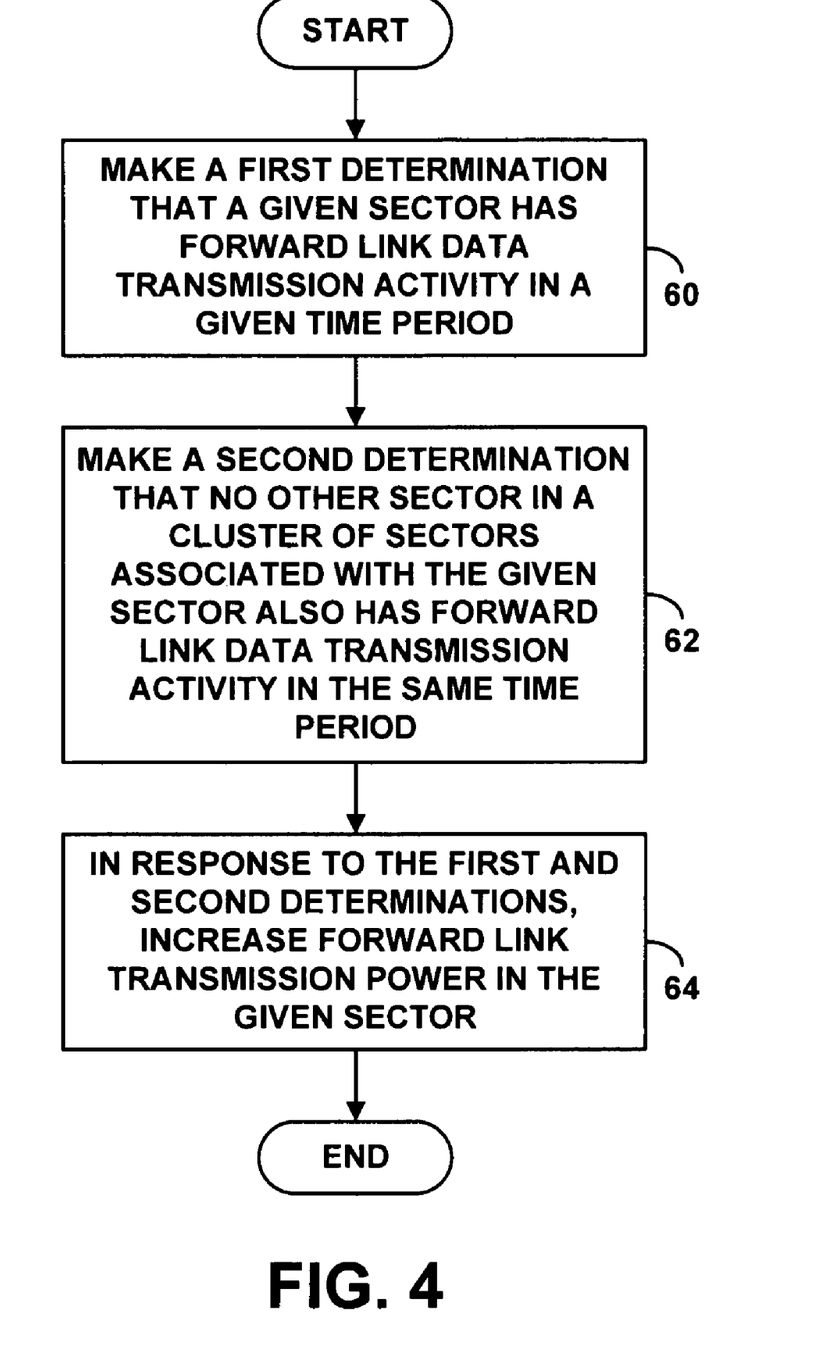
FIG. 4 is a flow chart depicting functional operation of a first embodiment of the invention.

FIG. 4 is a flow chart depicting functions that a BSC or other radio access network (RAN) entity would carry out in accordance with this embodiment. As shown in FIG. 4, at block 60, the BSC makes a first determination that a given sector has forward-link data transmission activity in a given time period. At block 62, the BSC makes a second determination that no other sector in a cluster of sectors associated with the given sector also has forward-link data transmission activity in the same time period. (Note that the BSC can make the first and second determinations simultaneously or in any preferred order, i.e., determine simultaneously that the given sector has forward-link data transmission activity in a given time period and that no other sector in a cluster associated with the given sector also has forward-link data transmission activity in that time period.) At block 64, in response to the first and second determinations, the BSC then increases forward-link transmission power in the given sector.

In a preferred embodiment, the BSC will perform this inventive process per slot or per series of slots, based on an analysis of a given cluster of sectors associated with the given sector. The cluster of sectors associated with a given sector can be defined simply to be the known neighbor sectors for that sector. Alternatively, the cluster can be defined in some other way, such as those sectors covering a geographic position within a certain distance from the BTS of the given sector. Other cluster definitions can be used as well.

In an exemplary process, the BSC will monitor forward-link data transmission activity of each of a plurality of sectors that the BSC serves, preferably all on a common carrier frequency, as indicated by usage data 58 for instance. For each sector that has (or is about to have) forward-link data transmission activity in a given time period (e.g., in a given slot or in a given series of slots, or in a given fraction of a slot for that matter), the BSC will examine the cluster of sectors associated with that sector to determine whether any other sector in the cluster also has (or is about to have) data transmission activity in the same time period. If the BSC determines that no other sector in the cluster also has (or is about to have) data transmission activity in the same time period, then the BSC will increase forward-link transmission power in the sector, so as to likely increase the effective data rate on the sector, i.e., the data rate for transmission to a mobile station operating in the sector.

By way of example, in the arrangement of FIG. 1, assume that mobile station 40 is scheduled to receive data though sector 30 in an upcoming (e.g., next) timeslot, and assume no mobile stations are scheduled to receive data through sectors 28 and 32 in that timeslot. Considering usage data 58, the BSC would thus determine that, for that timeslot, sector 30 has forward-link data transmission activity and no sector in a cluster associated with sector 30 (e.g., sectors 28 and 32) also have forward-link data transmission activity. In response, the BSC would increase the gain of the power amplifier for sector 30 during the data channel segments of that timeslot, so as to transmit data in sector 30 at a power level higher than the normal (full) sector transmit power.

The increase in power level can be to any level desired. By way of example, and without limitation, if the normal sector transmit power is approximately 16 Watts (i.e., give or take 3

Watts), the BSC may increase the transmit power to approximately 25 Watts. Other examples are possible as well.

In a preferred embodiment, the BSC will raise the power on just the data channel in each slot (or fraction of slot) at issue. That way, the power change will be unlikely to impact the C/I computations made by mobile stations operating in the cluster. Alternatively, however, the BSC can raise the power on other channels in the sector as well, such as on the pilot channel and on the MAC channel, in each slot (or fraction thereof) at issue. By raising the power on the pilot channel, the BSC can advantageously cause the served mobile station to compute a higher C/I for the sector and to thus request a higher data rate the next time the mobile station sends a DRC, as will be described more below.

In one embodiment, the BSC can carry out this process on a per-timeslot basis and can thus increase the sector transmit power for a given timeslot and then revert to the normal transmit power for the next timeslot, if applicable. Alternatively, the BSC can carry out this process across a series of slots. In that case, however, the BSC will preferably monitor the state of the cluster on a per-slot basis, to determine whether any competing sector exists, i.e., whether any other sector in the cluster has (or is about to have) data transmission activity. If the BSC determines that at least one other sector in the cluster has (or is about to have) data transmission activity, then the BSC will preferably reduce the current sector's transmit power back to its normal level, so as to reduce the chances of negatively impacting transmissions in the competing sector(s). Further, when data transmission activity in the current sector stops, the BSC will preferably revert to the normal transmit power in the current sector.

As a further enhancement, the BSC may leverage the present invention by intentionally scheduling transmissions on various sectors in non-competing time slots. By way of example, if the BSC has a slot's worth of data to transmit on each of three separate sectors in a cluster, the BSC could transmit to the sectors in series, rather than transmitting to the sectors at the same time. That way, each sector could transmit at an increased data rate, thus increasing the likelihood that each transmission will occur at a higher effective data rate.

3. Increasing Data-Transmission Power for Sole Sector Serving One or More Active Mobile Stations in Cluster As further noted above, a second embodiment of the invention similarly involves increasing a sector's transmit power based on an analysis of an associated cluster of sectors, but this time in a scenario where no other sector in the cluster currently serves at least one active mobile station. As explained above, the rationale for this process is that increasing the serving sector's pilot strength will increase the numerator, C, in the C/I ratio computed by a mobile station in the sector, and so the mobile station will advantageously request a higher data rate in its next DRC.

Figure 5:
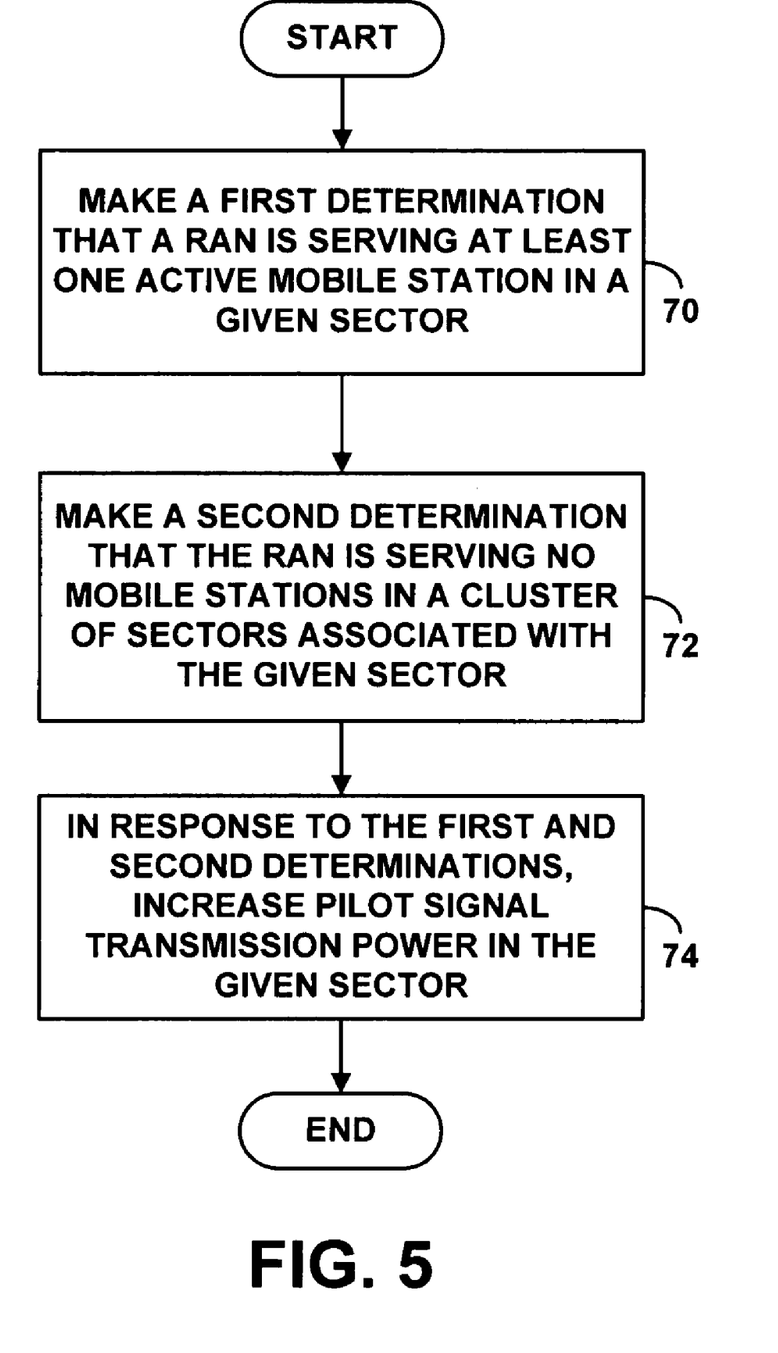
FIG. 5 is a flow chart depicting functional operation of a second embodiment of the invention.

FIG. 5 is a flow chart depicting functions that a BSC or other RAN entity would carry out in accordance with this embodiment. As shown in FIG. 5, at block 70, the BSC makes a first determination that the RAN (e.g., the BSC) is serving at least one active mobile station in a given sector. At block 72, the BSC makes a second determination that the RAN is serving no mobile stations in a cluster of sectors associated with the given sector. (Note that the BSC can make the first and second determinations at once, i.e., determine at once that the RAN is serving at least one active mobile station in a given sector and that the RAN is serving no mobile stations in a cluster of sectors associated with the given sector.) At block 74, in response to the first and second determinations, the BSC then increases pilot signal transmission power in the given sector.

In an exemplary process according to this aspect of the invention, the BSC will monitor each of a plurality of sectors that the BSC serves, preferably all on a common carrier frequency, and over a desired time period (such as a slot, a series of slots, or a fraction of a slot), again referring to usage data 58 for instance. The BSC will thereby identify each (or at least one) sector that is currently serving (or is about to serve) at least one active mobile station. In this regard, as noted above, a mobile station is considered to be active under IS-856 (by way of example) once it sends a connection request message (or a response message to a RAN initiated connection) and receives in response a MAC ID and channel assignment to be used for data communication. Additionally the reverse link signaling channels are established during this connection phase. The serving BSC preferably keeps a record in usage data 58 indicating which mobile stations are active. Further, the serving BSC preferably keeps a record of which sectors are serving which mobile stations at which times and for how long each of these sectors have been serving which mobile stations. Consequently, the BSC can readily determine at any time whether a given sector is currently serving any active mobile stations.

For each sector that is serving (or is about to serve) at least one active mobile station, the BSC will examine the cluster of sectors associated with that sector to determine whether any other sector in the cluster also serves (or is about to serve) at least one active mobile station. If the BSC determines that no other sector in the cluster also serves (or is about to serve) at least one active mobile station, then the BSC will increase the forward-link transmission power in the sector, so as to likely increase effective data rate on the sector. As with the process described above, the increase in power level can be to any level desired.

By way of example, in the arrangement of FIG. 1, assume that mobile station 40 is active in sector 30 and that neither mobile stations 42 or 44, nor any other mobile stations, are active in any sector of a cluster associated with sector 30. (Although mobile stations 42 and 44 are positioned, respectively, in sectors 28 and 32, assume that they are currently dormant.) Considering usage data 58, BSC would thus conclude that it is serving at least one active mobile station in sector 30 and that it is serving no active mobile stations in any sector of a cluster associated with sector 30. In response, the BSC would increase the gain of the power amplifier for sector 30 during the pilot channel segments of that timeslot, so as to transmit the pilot signal in sector 30 at a power level higher than the normal (full) sector transmit power.

As noted above, the BSC will raise the transmit power on just the pilot channel in each slot (or fraction of slot) at issue. In an alternative embodiment, however, the BSC can raise the transmit power on channels other than or in addition to the pilot channel. For instance, the BSC can raise the sector transmit power on the data channel and/or on the MAC channel. By raising the transmit power on the data channel, the BSC will likely achieve the same improvement noted above, namely, further expedited early termination.

As with the above process, the BSC can carry out this process on a per-timeslot basis and can thus increase the sector transmit power for a given slot and then revert to the normal transmit power for the next slot, if applicable. Alternatively, the BSC can carry out this process across a series of slots. For instance, the BSC can determine whether, over the past X number of slots, the current sector has served at least one active mobile station and no other sectors in the current sector's associated cluster has served at least one active mobile station. In response, the BSC can raise the pilot power and perhaps other transmit power from the current sector during the next slot. On a sliding-window basis, the BSC can then repeat this process. Note, however, that the BSC may need to revert to the normal transmit power in the current sector every once in a while (e.g., periodically according to an operator specified period), in order to ensure that the increased pilot power in the current sector has not inappropriately attracted active mobile stations that would or should otherwise be active in other sectors instead.

Further, the BSC will also preferably monitor the state of the cluster on a per-slot basis, to determine whether any competing sector exists, i.e., whether any other sector in the cluster serves (or is about to serve) at least one active mobile station. If the BSC determines that at least one other sector in the cluster serves (or is about to serve) at least one other active mobile station, then the BSC will preferably reduce the current sector's transmit power back to its normal level, so as to reduce the chances of negatively impacting transmissions in the competing sector(s). Further, when the current sector stops serving at least one active mobile station in the current sector, the BSC will preferably revert to the normal transmit power in the current sector.

As described above, increasing the pilot power of a sector that is the only sector (in a cluster) that is serving at least one active mobile station can help to increase the C/I ratio computed for that sector and can thus help to increase the data rate initially requested in that sector. On the other hand, increasing pilot power in a sector can negatively impact performance for a mobile station that is likely to leave the sector soon, such as a mobile station that is quickly passing through the sector or that is operating at a border between the sector and another sector. Increasing the pilot power can prevent such a mobile station from handing off to an adjacent sector, since the mobile station would detect a higher pilot in the current sector. As a result, the mobile station can lose connectivity as it physically moves out of the current sector.

To help avoid this problem, in a preferred embodiment, the BSC can limit application of the inventive process to a scenario where each of the one or more active mobile stations in the sector at issue is considered "stationary" in the sector. A mobile station can be considered stationary in a sector if the mobile station has been operating in the sector for an operator-defined threshold period, such as 2 seconds (regardless of whether the mobile station is actually moving within the sector). One way for the BSC to determine if a mobile station is stationary in a given sector is to determine, based on usage data 58 for instance, whether the mobile station has selected the given sector as its serving sector (i.e., the mobile station has sent its DRC to the given sector) continuously for the threshold period. Thus, in practice, the BSC can make this determination for each of the one or more active mobile stations in the sector at issue and can condition application of the inventive process on a determination that each mobile station is stationary.

Note that, in an alternative embodiment, the BSC could consider a mobile station to be "stationary" if the mobile station is not moving or is not substantially moving, as determined by tracking the mobile station's location using GPS measurements, triangulation, or other location-determination technologies now known or later developed. The BSC may then similarly condition application of the inventive process on a determination that each of the one or more active mobile stations in the sector at issue is stationary.

4. Combination of Embodiments

As noted above, the BSC can apply logic to carry out either or both of the above embodiments. For example, in a scenario where only a single active mobile station (e.g., mobile station 40) is currently being served by each sector in a cluster, the BSC may determine that second embodiment would not apply. However the BSC may determine that the first embodiment applies if only one of those mobile stations is currently receiving data (even though others are active at the same time). Other examples are possible as well.

5. Conclusion

Exemplary embodiments of the present invention have been described and illustrated. It will be understood of course that changes and modifications can be made consistent with the invention as claimed.

We claim:

1. In a radio access network (RAN) of the type including an antenna system that radiates to define a plurality of wireless coverage areas, wherein, in each wireless coverage area, the RAN transmits a respective pilot signal, a method comprising:

determining that a given wireless coverage area is transmitting data and that no other wireless coverage area in a cluster of wireless coverage areas associated with the given wireless coverage area is also transmitting data;

and responsively increasing power of transmission of the pilot signal in the given wireless coverage area; and wherein increasing power of transmission of the pilot signal in the given wireless coverage area comprises increasing power of transmission of the pilot signal in the given wireless coverage area from a normal power of transmission to an increased power of transmission, further comprising:

thereafter making a determination that at least the given wireless coverage area is no longer transmitting data or that another wireless coverage area in a cluster of wireless coverage areas associated with the given wireless coverage area is also transmitting data; and responsive to the determination, reducing the power of transmission of the pilot signal in the given wireless coverage area back to the normal power of transmission.

2. In a radio access network (RAN) of the type including an antenna system that radiates to define a plurality of sectors in which the RAN serves mobile stations, wherein, in each sector, the RAN transmits a pilot signal, a method comprising:

making a first determination that the RAN is serving at least one active mobile station in a given sector;

making a second determination that the RAN is serving no mobile stations in a cluster of sectors associated with the given sector; and responsive to the first and second determinations, increasing pilot signal transmission power in the given sector; and wherein increasing pilot signal transmission power in the given sector comprises increasing pilot signal transmission power in the given sector from a normal pilot signal transmission power to an increased pilot signal transmission power, further comprising:

thereafter making a third determination that at least the first determination or second determination no longer holds true; and responsive to the third determination, reducing the pilot signal transmission power in the given sector back to the normal pilot signal transmission power.

3. The method of claim 2, wherein the cluster of sectors is a set of sectors neighboring the given sector.

4. The method of claim 2, further comprising:

conditioning the increase in pilot signal transmission power on a determination that each of the at least one active mobile station in the given sector is stationary.

5. The method of claim 2,
wherein, in each sector, the RAN transmits in timeslots, each timeslot being divided into channels including at least a pilot channel, and
wherein, increasing the pilot signal transmission power in the given sector comprises increasing forward-link pilot-channel transmission power in the given sector.

6. The method of claim 5, wherein the channels in each timeslot further include a data channel and a Media Access Control (MAC) channel, the method further comprising:
responsive to the first and second determinations, also increasing forward-link data-channel transmission power in the given sector and forward-link MAC-channel transmission power in the given sector.

7. The method of claim 2, wherein the RAN has a normal pilot signal transmission power, and wherein increasing the pilot signal transmission power comprises increasing the pilot signal transmission power to higher than the normal pilot signal transmission power.

8. The method of claim 7, wherein the normal pilot signal transmission power is approximately 16 Watts, and wherein increasing the pilot signal transmission power to higher than the normal pilot signal transmission power comprises increasing the pilot signal transmission power to approximately 25 Watts.

9. The method of claim 2, further comprising performing the method on a per-timeslot basis.

10. In a radio access network (RAN) of the type including an antenna system that radiates to define a plurality of sectors in which the RAN serves mobile stations, wherein, in each sector, the RAN transmits in timeslots, each timeslot being divided into channels including at least a pilot channel, the method comprising:
making a first determination that, over a designated number of timeslots, the RAN has served at least one active mobile station in a given sector and the RAN has served no active mobile stations in a cluster of sectors associated with the given sector; and
responsive to the first determination, increasing pilot-channel transmission power in the given sector; and wherein increasing pilot-channel transmission power in the given sector comprises increasing the pilot-channel transmission power in the given sector from a normal pilot-channel transmission power to an increased pilot-channel transmission power, further comprising:
thereafter making a second determination that the RAN is serving at least one active mobile station in the cluster of sectors; and
responsive to the second determination, reducing the pilot-channel transmission power in the given sector back to the normal pilot-channel transmission power.

11. The method of claim 10, wherein the channels further include a data channel, the method further comprising:
responsive to the first determination, also increasing data-channel transmission power in the given sector.

12. The method of claim 10, wherein the channels further include a Media Access Control (MAC) channel, the method further comprising:
responsive to the first determination, also increasing the MAC-channel transmission power in the given sector.

13. The RAN of claim 10, wherein the radio controller makes the first and second determinations on a sliding-window basis over time.

14. A radio access network (RAN) comprising:
an antenna system arranged to transmit radio frequency signals in a plurality of sectors in which the RAN serves mobile stations;
a radio controller arranged to control power and timing of forward-link transmissions in each sector, wherein, in each sector, the radio controller causes the antenna system to transmit in timeslots, each timeslot being divided into channels including at least a pilot channel;
wherein (i) the radio controller makes a first determination that the RAN is serving at least one active mobile station in a given sector, (ii) the radio controller makes a second determination that the RAN is serving no mobile stations in a cluster of sectors associated with the given sector, and (iii) in response to the first and second determinations, the radio controller increases pilot-channel transmission power in the given sector; and
wherein, when the radio controller increases the pilot-channel transmission power in the given sector, the radio controller increases the pilot-channel transmission power from a normal pilot-channel transmission power to an increased pilot-channel transmission power, and
wherein, after increasing the pilot-channel transmission power, the radio controller makes a third determination that at least the first determination or second determination no longer hold true, and, in response to the third determination, the radio controller reduces the pilot-channel transmission power in the given sector back to the normal pilot-channel transmission power.

15. The RAN of claim 14,
wherein each sector has a normal pilot-channel transmission power, and
wherein, when the radio controller increases pilot-channel transmission power in the given sector, the radio controller increases the pilot-channel transmission power to higher than the normal pilot-channel transmission power.

16. The RAN of claim 14, wherein the channels further include a data channel and a Media Access Control (MAC) channel, and wherein, when the radio controller increases pilot-channel transmission power in the given sector, the radio controller increases pilot-channel transmission power without also increasing data-channel transmission power in the given sector and further without also increasing MAC-channel transmission power in the given sector.

17. The RAN of claim 14, wherein the channels further include a data channel and a Media Access Control (MAC) channel, and wherein, in response to the first and second determinations, the radio controller also increases data-channel transmission power in the given sector and MAC-channel transmission power in the given sector.

* * * * *